(12) United States Patent
Mochizuki

(10) Patent No.: US 7,156,888 B2
(45) Date of Patent: Jan. 2, 2007

(54) CERIUM-BASED ABRASIVE MATERIAL AND METHOD FOR PREPARATION THEREOF

(75) Inventor: Naoyoshi Mochizuki, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/473,402

(22) PCT Filed: Mar. 18, 2003

(86) PCT No.: PCT/JP03/03224

§ 371 (c)(1),
(2), (4) Date: Sep. 30, 2003

(87) PCT Pub. No.: WO03/080757

PCT Pub. Date: Oct. 2, 2003

(65) Prior Publication Data

US 2004/0111977 A1    Jun. 17, 2004

(30) Foreign Application Priority Data

Mar. 22, 2002    (JP)    ............................. 2002-081392

(51) Int. Cl.
*C09K 3/14*    (2006.01)
*C09G 1/02*    (2006.01)
(52) U.S. Cl. ........................... 51/307; 51/309; 423/263
(58) Field of Classification Search ................ 51/307, 51/309; 106/3; 423/263
See application file for complete search history.

(56) References Cited

U.S. PATENT DOCUMENTS 4,786,325 A * 11/1988 Melard et al. .................. 106/3
4,942,697 A * 7/1990 Khaladji et al. ............... 51/309
5,089,331 A * 2/1992 Ryoke et al. ................ 428/323

FOREIGN PATENT DOCUMENTS

| JP | 10-183103 A | | 7/1998 |
| JP | 11-269455 A | | 10/1999 |
| JP | 2001-035524 | * | 2/2001 |
| JP | 2001-351883 A | | 12/2001 |
| WO | WO 03/080757 A1 | | 10/2003 |

* cited by examiner

*Primary Examiner*—Michael Marcheschi
(74) *Attorney, Agent, or Firm*—Rothwell, Figg, Ernst & Manbeck, P.C.

(57) ABSTRACT

The object of the present invention is to provide a powder cerium-based abrasive which enables the preparation of a cerium-based abrasive slurry, in which the dispersed state of the abrasive particles is maintained for a long period of time, simply by blending it with a dispersion medium such as water and which makes easier the after-treatment of the abrasive slurry having been used. The cerium-based abrasive of this invention is a cerium-based abrasive including chlorine-containing compounds in which chlorine (element) is contained in amounts, in terms of total mass, equivalent to 0.05% to 5.0% of the mass of the total rare earth oxide contained therein. An abrasive slurry including the abrasive of this invention as a solid content is superior in dispersion maintaining properties of its abrasive particles. Accordingly, an abrasive slurry having a stable concentration of the solid content can be supplied continuously. Further, the abrasive requires no dispersant for maintaining its dispersed state, and hence separation treatment for a dispersant is unnecessary after the abrasive has been used. Thus, the abrasive according to the present invention makes simpler the after-treatment of the abrasive slurry after use.

8 Claims, No Drawings

CERIUM-BASED ABRASIVE MATERIAL AND METHOD FOR PREPARATION THEREOF

CROSS REFERENCE TO RELATED APPLICATION

This application is a 35 USC § 371 National Phase Entry Application from PCT/JP03/03224, filed Mar. 18, 2003, and designating the U.S.

TECHNICAL FIELD

This invention relates to a cerium-based abrasive and a method for manufacturing the same, in particular, a cerium-based abrasive having excellent properties to maintain its dispersed state and a method for manufacturing the same.

BACKGROUND ART

There are two types of cerium-based abrasives (hereinafter sometimes referred to simply as abrasive): an abrasive powder provided in a dried powder state; and an abrasive slurry provided in a slurry state, which is a mixture of an abrasive powder and a dispersion medium such as water. Of the two, the abrasive slurry is used for polishing as it is, while the abrasive powder is mixed with a dispersion medium such as water to prepare an abrasive slurry before it is used for polishing. For example, the abrasive slurry is used for polishing in such a manner as to be continuously or intermittently supplied between a polishing pad and a surface to be polished. And the used abrasive slurry is usually disposed of through after-treatment known as solid-liquid separation treatment. This solid-liquid separation treatment is, for example, treatment to sediment the solid content of the abrasive slurry by adding a flocculant thereto.

As abrasive slurries used for polishing, those in which abrasive particles (solid content) are in the dispersed state are preferable. An abrasive slurry having abrasive particles in the dispersed state makes it convenient, for example, to carry out polishing operations while continuously supplying the abrasive slurry, because polishing properties such as polishing rate is stabilized and the quality of the surface obtained by the polishing is also stabilized. Means for dispersing abrasive particles include, for example, stirring the abrasive slurry. However, even if the stirring permits abrasive particles to be dispersed, once the abrasive slurry is left standing still, they start to settle at the bottom of the abrasive slurry and their dispersed state is impaired. Using the abrasive slurry in which the dispersed state of the abrasive particles has been impaired is not preferable because its polishing properties such as polishing rate vary. For example, if a portion of such an abrasive slurry is supplied of which solid content, that is, cerium-based abrasive particles content is high, inconveniences of, for example, scratches being likely to occur may be caused.

To eliminate these inconveniences, in recent years, a method has been used in which an agent for inhibiting the sediment of abrasive particles in an abrasive slurry, known as dispersant, is added to the abrasive slurry. According to this method, the dispersed state of the abrasive particles brought by stirring or the like can be maintained for a longer period of time.

However, the conventional dispersants, such as sodium hexametaphosphate and ammonium polyacrylate, contain phosphorus or ammonia. And the use of these dispersants permits the abrasive slurry to contain these components, which results in increase in the trouble of after-treating the abrasive slurry used. In particular, when using no dispersant in polishing operations, polishing operators have only to do the above described solid-liquid separation treatment as the after-treatment, but on the other hand, when using a dispersant as above, it is necessary to further separate phosphorus or nitrogen compound (ammonia) from the liquid obtained by the solid-liquid separation treatment. The method for separating nitrogen component from used abrasive slurries includes, for example, ammonia stripping or nitration-denitrification.

In recent years, there has been an increasing need for high-precision polishing, such as finish polishing of glass substrates for hard disks or LCDs, in the field of manufacturing electronic materials. With this increasing need, there have also been increasing demands for abrasives of microparticles. For powders, it is generally considered that as long as they can be fully dispersed, those with a smaller particle diameter are harder to settle out when prepared in a slurry and their dispersed state can be maintained for a longer period of time. In fact, however, for cerium-based abrasives, those with a smaller particle diameter have lower dispersion properties and are easy to coagulate. In other words, even if the particle diameter of cerium-based abrasive particles is decreased, their dispersion maintaining property is not improved; therefore, their dispersion maintaining property cannot be ensured satisfactorily simply by mixing them in a dispersion medium and stirring the mixture.

This invention has been made in the above described background, and its subject is to provide a cerium-based powder abrasive enabling a cerium-based abrasive slurry to be prepared and the abrasive slurry after use to be treated easily, simply by mixing it with a dispersion medium such as water, wherein the dispersed state of its abrasive particles is maintained for a longer period of time, and the method for manufacturing the same.

DISCLOSURE OF THE INVENTION

In light of the above described subject, the inventor of this invention investigated the dispersion of cerium-based abrasives. As a result, they found that in a cerium-based abrasive slurry containing chlorine (element), the sedimentation of its abrasive particles is slow and it has excellent properties of maintaining the dispersed state of the abrasive particles for a longer period of time (hereinafter referred to as dispersion maintaining properties). However, it was also found that in the preparation of an abrasive slurry, simply adding a water-soluble chlorine-containing substance, such as hydrochloric acid or ammonium chloride, does not improve the dispersion maintaining property of the abrasive. Thus, the inventor further pursued his study, and finally conceived this invention.

This invention is a cerium-based abrasive including chlorine-containing compounds, wherein chlorine (element) is contained in amounts, in terms of total mass, equivalent to 0.05% to 5.0% of the mass of the total rare earth oxide (TREO) contained.

The abrasive slurries including the cerium-based abrasive of this invention as a solid content are superior to the conventional abrasive slurries in terms of the property of maintaining abrasive particles' dispersion. If the dispersed state of abrasive particles is maintained for a long period of time, the polishing properties of the abrasive slurries, such as polishing rate, will be stabilized, because abrasive slurries with stable solid content concentrations can be supplied continuously or intermittently. This eliminates the necessity of repeating the dispersion operations, and even if the dispersion operations need to be repeated, the number of times the operations are repeated can be very small, resulting in saving the operator's time and labor during polishing operations and improving the workability. Further, since the abrasive slurries do not require the use of a dispersant, the after-treatment of used abrasive slurries becomes simpler.

The reasons that the abrasive of this invention is superior in dispersion maintaining properties are not necessarily clear yet. However, the results of experiments showed that adding water-soluble chlorine-containing substances, such as hydrochloric acid, to an abrasive in the preparation of a slurry (after roasting) did not improve the dispersion properties of the abrasive, whereas the abrasive having, as its part, chlorine-containing compounds of rare earth elements, such as lanthanum oxychlorides obtained by roasting lanthanum chloride hydrates, of which solubility in water at room temperature was low, improved the dispersion properties. This led to the following conclusion. Specifically, when an abrasive has substances which contain chlorine (Cl) in the dried state, such as chlorine-containing compounds of rare earth elements, the dispersion maintaining properties of the abrasive are improved. In the cerium-based abrasive of this invention, most chlorine exists in chlorine-containing compounds of rare earth elements (for example, oxychlorides of rare earth elements). And the abrasive particles having chlorine-containing compounds of rare earth elements are different from those having been used or currently in use in characteristics of, for example, surface profile; as a result, their dispersion maintaining properties when they are in the slurry state are improved. It is considered that chlorine-containing compounds of rare earth elements are produced in the roasting step, which is one of the steps of manufacturing the cerium-based abrasive, by roasting the raw materials of the cerium-based abrasive (hereinafter sometimes referred to simply as raw materials) while bringing the same into contact with chlorine-containing substances.

Concrete examples of the oxychlorides of rare earth elements, which the cerium-based abrasive is considered to have, include oxychlorides of lanthanoids (LnOCl etc.) such as lanthanum oxychlorides (LaOCl etc.) and cerium oxychlorides (CeOCl, $CeOCl_2$, etc.).

The total mass of the chlorine (element) contained in the abrasive is preferably equivalent to 0.05% to 5.0% of the mass of TREO contained in the same, as described above. This is based on the experimental results that when the total mass of the chlorine (element) is less than 0.05%, the dispersion maintaining properties were not effectively improved; whereas, when the total mass of the chlorine (element) is more than 5.0%, the abrasive was unsuitable for manufacturing, though it had good dispersion maintaining properties. For example, the abrasive having too large an amount of chlorine-containing substances can significantly corrode the roasting furnace used in the manufacturing of the abrasive. Once the roasting furnace is corroded, foreign substances which may cause scratches can fall off the sidewalls of the roasting furnace and the risk of contamination of the raw materials with the foreign substances is increased during the roasting. Further, the total mass of the chlorine is more preferably equivalent to 0.2% to 3.0% of the mass of TREO, because the abrasive containing such amount of chlorine has more excellent dispersion maintaining properties and is suitable for industrial manufacturing. However, it is considered that if the corrosion of the roasting furnace is not a problem, an abrasive can be provided which contains chlorine in amount equivalent to 5.0% or more of the mass of TREO and has good dispersion maintaining properties.

The total mass of the chlorine (element) contained in a cerium-based abrasive does not mean only that of the chlorine existing as part of the chlorine-containing compounds of rare earth elements, but of the entire chlorine contained in the abrasive. Generally a cerium-based abrasive is prepared into a slurry abrasive before being used for polishing; accordingly, the total mass of the chlorine should be measured after the abrasive has been prepared into a slurry abrasive. However, since no chlorine is considered to go in and out before and after the preparation of a slurry abrasive, the total mass of the chlorine in the slurry abrasive can be specified based on the abrasive in the powder state before being prepared into a slurry or on the abrasive obtained by drying an abrasive slurry. The total mass of the chlorine is easier to specify when using a dried abrasive.

The term "the mass of TREO (the total rare earth oxides)" herein used means the total mass obtained by considering all the rare earth elements existing in an abrasive as rare earth oxides regardless of their existing forms. This originates from the fact that the following method is commonly used as a method for measuring TREO. Specifically, the method for measuring TREO commonly in use includes the steps of: applying pre-treatments, such as dissolution and dilution, to a specimen, if necessary; precipitating all the rare earth elements as oxalates; filtering, drying and roasting the oxalates to give rare earth oxides; and measuring the mass of the rare earth oxides. Accordingly, even in cases where cerium (Ce) and lanthanum (La) exist in chlorine-containing compounds such as cerium oxychloride and lanthanum oxychloride, as long as TREO is measured by the above method, the amounts of Ce and La are obtained automatically in terms of mass of rare earth oxides.

As described above, it was found that the improvement in dispersion maintaining properties of a cerium-based abrasive is related to the existence of oxychlorides of rare earth elements in the abrasive. So then the inventor further investigated the relation between the existence of rare earth elements in a cerium-based abrasive and the dispersion maintaining properties.

The investigation revealed that a cerium-based abrasive was preferable in which the cerium oxide percentage in TREO was 40.0% by mass to 99.5% by mass and the lanthanum oxide percentage in TREO was 0.5% by mass to 60.0% by mass.

This is based on the result of the investigation that in a cerium-based abrasive having a lanthanum oxide percentage in TREO of less than 0.5% by mass, its quality was unstable, for example, sometimes it did not have necessary dispersion maintaining properties. On the other hand, a cerium-based abrasive having a cerium oxide percentage in TREO of less than 40.0% by mass did not provide a necessary polishing rate. These results showed that preferably the lanthanum oxide percentage in TREO was 0.5% by mass to 60.0% by mass and the cerium oxide percentage in TREO was 40.0% by mass to 99.5% by mass.

The terms "cerium oxide" and "lanthanum oxide" herein used in relation to the term TREO, as in the cases of "the cerium oxide percentage in TREO" and "the lanthanum oxide percentage in TREO", mean the cerium oxide and the lanthanum oxide obtained by the process of TREO measurements, regardless of their original existing forms, as is known from the measurement of TREO described above. Accordingly, "cerium oxide" and "lanthanum oxide" in this case include those existing in actual abrasives in the form of cerium oxychloride and lanthanum oxychloride. The maximum values of the above described ranges are those in cases where the oxides of rare earth elements are only cerium oxide and lanthanum oxide; however, in cases where TREO include the oxides (including chlorides) of rare earth elements other than cerium and lanthanum oxides, the substantial maximum percentages of cerium oxide and lanthanum oxide in TREO become smaller depending on the mass of those other oxides.

It has already been described that a cerium-based abrasive having a lanthanum oxide percentage in TREO of 0.5% by mass or more stably has excellent dispersion maintaining properties; and perhaps, one main reason for this is as follows. An abrasive as above stably contains a necessary amount of oxychlorides of rare earth elements. Thus, it was found that lanthanum (element) contained in lanthanum oxide etc. was considered to play a role in allowing an abrasive to contain oxychlorides of rare earth elements. As described above, the oxychlorides of rare earth elements are considered to be formed in the roasting step. Normally lanthanum is supplied only from the raw materials of an abrasive; therefore, the lanthanum oxide percentages in TREO contained in the raw materials and in the abrasive produced from the raw materials are almost the same. Accordingly, if the lanthanum oxide percentage in TREO contained in the produced abrasive is 0.5% by mass or more, the equivalent amount of lanthanum oxide in TREO will be contained in the raw materials as well. Thus, in the abrasive containing a certain amount of lanthanum oxide, oxychlorides of rare earth elements should have certainly been formed in the step of roasting and it excels in dispersion maintaining properties.

Preferably the molar ratio of the chlorine (element) to the lanthanum (element) (Cl/La) in a cerium-based abrasive is 0.02 to 1.0.

The reason for this is that in a cerium-based abrasive of which chlorine (element) to lanthanum (element) molar (mol) ratio (Cl/La) is less than 0.02, the lanthanum oxide is susceptible to hydration and its life as an abrasive is short. A cerium-based abrasive of which Cl to La molar ratio is more than 1.0 is possible to produce if chlorine-containing compounds of rare earth elements (e.g. chlorides of rare earth elements) are used as the raw materials; however, the abrasive thus obtained is inconveniently unstable in quality, e.g., it has a varying polishing rate.

The inventor investigated a method for manufacturing the cerium-based abrasive described above. He investigated particularly the step of allowing the cerium-based abrasive to contain chlorine (or chlorine-containing compounds). As a result, they conceived a method for manufacturing the abrasive as described below.

The invention is a method for manufacturing a cerium-based abrasive including a step of roasting raw materials for the cerium-based abrasive, characterized in that the raw materials are roasted while they are brought into contact with chlorine-containing substances in the roasting step.

As in the case of this invention, if raw materials for a cerium-based abrasive are roasted while they are brought into contact with chlorine-containing substances, the cerium-based abrasive is allowed to contain chlorine effectively. One possible reason for this is that when the raw materials are roasted while they are brought into contact with chlorine-containing substances, oxychlorides of rare earth elements such as lanthanum oxychloride are produced. An abrasive containing a necessary amount of chlorine component significantly excels in dispersion maintaining properties of abrasive particles. In other words, when it is prepared into an abrasive slurry, its dispersed state is maintained for a long period of time, and its solid content concentration and polishing properties such as polishing rate are stabilized. When carrying out polishing using such an abrasive slurry, a homogeneous polished surface is obtained and scratches are prevented from occurring. Furthermore, due to the stable polishing rate, such an abrasive slurry is conveniently used.

The raw materials are not limited in particular, but preferable raw materials include bastnaesite concentrate, and oxides (referred to as rare earth oxides below), carbonates (referred to as rare earth carbonates below), hydroxides and oxalates of rare earth elements, which are obtained through purification of bastnaesite concentrate, monazite concentrate or Chinese complex ore, since they are cheap inter alia.

The chlorine-containing substances with which the raw materials are brought into contact are not limited to any specific ones, either. Such substances include: for example, chlorine; chlorine-containing acids such as hydrochloric acid, perchloric acid and hypochlorous acid; ammonium chloride; chlorides of alkaline metals and alkaline earth metals (including salt hydrates); aluminium chloride (including salt hydrates); chlorides of rare earth elements (including salt hydrates); and chlorine compounds such as hydrogen chloride gas. Of these substances, chlorine is normally used in the gas state and aluminium chloride is used mainly in the powder state. And chlorine-containing acids, ammonium chloride, chlorides of rare earth elements, chlorine gas, and hydrogen chloride gas are preferable in that they contain no metals, such as alkaline metals and alkaline earth metals, which promote the anomalous grain growth during roasting. And of these substances, hydrochloric acid is most preferable because it is most inexpensive and contains no nitrogen.

In the manufacturing of abrasives, to eliminate alkaline metals, such as sodium, which contribute to the anomalous grain growth, the raw materials after initial milling (the raw materials before roasting) are subjected to mineral acid treatment, depending on the situation. This mineral acid treatment is carried out by washing the raw materials after the milling with a mineral acid solution such as aqueous solution of hydrochloric acid. However, the chlorine component in the raw materials has been considered to be an impurity, and the raw materials after the mineral acid treatment have been fully washed with water etc. before sent to the next step. Accordingly, the raw materials subjected to roasting and the abrasive having been manufactured have contained almost no chlorine (element). This invention has been made as a result of the inventor's finding that the chlorine component, which has been used as means for removing alkaline metals and considered to be an impurity in the manufacturing of abrasives, contributes to the improvement in dispersion maintaining properties of abrasives.

In the following, the details will be described of the inventor's investigation of methods for roasting raw materials of a cerium-based abrasive while bringing them into contact with chlorine-containing substances.

The methods are classified into two major categories: methods for roasting raw materials having chlorine-containing substances and methods for roasting raw materials while allowing the atmospheric gas to contain a gas of chlorine-containing substances.

First, one type of (the former) roasting method, that is, the methods for roasting raw materials having chlorine-containing substances will be described. When using this type of roasting method, raw materials having chlorine-containing substances need to be prepared as raw materials to be roasted.

Methods for obtaining raw materials having chlorine-containing substances include, for example, methods in which raw materials and chlorine-containing substances are dry blended; methods in which raw materials and chlorine-containing substances are wet-blended; and methods in which a precipitate of cerium-containing rare earths is formed by adding a precipitating agent to an aqueous solution of cerium-containing rare earth chlorides, followed by solid-liquid separation thereof.

Hereinafter the process for bringing raw materials into contact with chlorine-containing substances will be generically referred to as chlorine treatment.

The chlorine treatment methods using dry blending involve, for example, blending powder chlorine-containing substances with raw materials, and chlorine-containing substances preferably used in this type of treatment methods include, for example, rare earth chlorides, $NH_4Cl$ (ammonium chloride), and aluminium chloride. When using dry blending, the blending can be carried out at the same time as dry milling.

The chlorine treatment methods using wet blending include: a treatment method in which raw materials and chlorine-containing substances are blended in the slurry state; and a treatment method in which raw materials and chlorine-containing substances are kneaded in the clay state. In more particular, these methods involve blending/kneading, for example, raw materials, chlorine-containing substances and a dispersion medium such as water. The order in which the above three are blended/kneaded can be arbitrary; specifically, the three can be blended/kneaded at a time, or any two of them can be blended/kneaded before blending/kneading the rest. When chlorine-containing substances also contain a dispersion medium such as water, raw materials having chlorine-containing substances can be obtained by blending/kneading the other two only without adding a dispersion medium. Chlorine-containing substances preferably used in these wet blending treatment methods include: for example, ammonium chloride; and chloride of alkaline earth metals such as sodium chloride (NaCl), KCL and $CaCl_2$; and chlorine-containing acids such as hydrochloric acid and perchloric acid. When using wet blending, the blending can be carried out at the same time as wet milling.

Since chlorine-containing substances are considered to uniformly exist in the raw materials having chlorine-containing substances obtained by the wet blending treatment methods, chlorine-containing substances can be brought into contact with the entire cerium-based abrasive at the time of roasting. Thus, an abrasive of stable quality with respect to dispersion maintaining properties can be manufactured. To obtain high chlorine content by adopting one of the above two types of wet blending treatment methods, in which raw materials and chlorine-containing substances are blended in the slurry state, in its drying step, a procedure in which the entire slurry is dried is more preferably used than a solid-liquid separation procedure which adopts filtration etc. This is because when carrying out solid-liquid separation, chlorine in the liquid is separated together with the liquid separated. One suitable full drying method is a spray drying method. When adopting the other type of wet blending treatment method, in which raw materials and chlorine-containing substances are blended in the clay state, chlorine will not be left in the liquid but will remain in the abrasive because no solid-liquid separation is performed.

As a result of the inventor's investigation, it was found that in the wet blending, solutions of chlorides of rare earth elements are preferable as the above described chlorine-containing substances. The result was such that even in the cerium-based abrasives in which the lanthanum oxide percentage in TREO was less than 0.5% by mass, those having been subjected to the wet-type chlorine treatment prior to the roasting step, the wet-type chlorine treatment adopting a solution of chlorides of rare earth elements, have required dispersion maintaining properties. Accordingly, it can be considered that if raw materials for an abrasive are subjected to the wet blending chlorine treatment using a solution of chlorides of rare earth elements prior to the roasting step, the abrasive obtained is reliably allowed to contain a necessary amount of oxychlorides of rare earth elements whether or not the raw materials contain lanthanum (element). If oxychlorides of rare earth elements are ensured in the abrasive, stable dispersion maintaining properties of the abrasive are also ensured.

Now will be described the third chlorine treatment method, that is, the treatment method in which a precipitate of cerium-containing rare earths is formed by adding a precipitating agent to an aqueous solution of cerium-containing rare earth chlorides, followed by solid-liquid separation thereof.

As for the concentration of the aqueous solution having chlorides of cerium-containing rare earths, 5 g to 400 g TREO mass/L is preferable, and 10 g to 300 g TREO mass/L is more preferable in this treatment method. If the concentration is less than the minimum value, excessive drainage occurs inconveniently, and if the concentration is more than the maximum value, stirring and slurry transfer are incoveniently difficult. The precipitating agents used include, for example, oxalic acid, ammonium oxalate, sodium oxalate, ammonium carbonate, ammonium hydrogencarbonate, aqueous ammonia, and sodium hydroxide. The precipitates formed include, for example, the oxalates, basic carbonates, carbonates and hydroxides of rare earth elements. The precipitating agents are added in amounts larger than those theoretically required for forming precipitates (hardly soluble salts of rare earth elements). When the acid concentration of the aqueous solution of cerium-containing rare earth chlorides is high, an alkali is added to neutralize the acid. The alkali added may be any one of the above precipitating agents except oxalic acid and oxalates or may be any other one. The alkali used for neutralization may be added at any time: before, at the same time as, or after the addition of a precipitating agent. Raw materials having chlorine-containing substances are obtained by subjecting the formed precipitates to solid-liquid separation through filtration etc. According to the conventional methods, the obtained raw materials are fully washed with water etc. to remove their chlorine component; however, according to the method for manufacturing an abrasive of this invention, the raw materials are not washed. When the chlorine content in the obtained raw materials is high, however, the content is adjusted by an appropriate method, for example, by dipping the materials into water etc., to obtain raw materials with an intended chlorine content.

It was found that as raw materials having chlorine-containing substances, which were obtained by the chlorine treatment prior to the roasting step and to be sent to the roasting step, materials in which the total mass of chlorine (element) corresponds to 0.1% to 8.0% of the mass of the total rare earth oxide (TREO) were preferable.

The reason is that if the total mass of chlorine (element) is increased to more than 8.0% of the mass of TREO, a problem of causing corrosion in the roasting furnace is more likely to occur. In more particular, the life of the apparatus is likely to be shortened and substances are likely to fall off the roasting furnace due to its corrosion and the possibility of the substances mixing into the raw materials is increased. To cope with these problems, the trouble of, for example, maintaining the roasting furnace more often has to be taken. On the other hand, if the total mass of chlorine (element) is decreased to less than 0.1% of the mass of TREO, the amount of chlorine (element) contained in the raw materials after the roasting might be decreased to less than 0.05% of the mass of the total rare earth oxide (TREO).

Particularly when the chlorine treatment is carried out using chlorine-containing substances other than the chlorine-containing compounds of rare earth elements and the lanthanum oxide percentage in TREO contained in the raw materials provided for the roasting is less than 0.5% by mass, the raw materials preferably contain chlorine (element) of which total mass corresponds to 0.5% or more of the mass of TREO. The reason for this is that when using chlorine-containing substances other than the chlorine-containing compounds of rare earth elements for the chlorine treatment, most of the chlorine-containing substances are decomposed by the roasting and are given off in the form of gases such as chlorine gas, which makes it hard to form oxychlorides of rare earth elements. Furthermore, oxychlorides of rare earth elements are considered to be hard to form when the content of the substances containing lanthanum (element), such as lanthanum oxide, is low. Accordingly, if raw materials which are allowed to contain a larger amount of chlorine, like the raw materials containing chlorine (element) of which total mass corresponds to 0.5% or more of the mass of TREO, are used, the formation of a necessary amount of oxychlorides of rare earth elements is ensured and an abrasive superior in dispersion maintaining properties can be manufactured.

It is to be confirmed that even when using chlorine-containing substances other than the chlorine-containing compounds of rare earth elements for the chlorine treatment, as long as the lanthanum oxide percentage in TREO contained in raw materials is 0.5% by mass or more (preferably 5% by mass or more), if the total mass of chlorine (element) contained in the raw materials provided for the roasting corresponds to 0.1% by mass or more and less than 0.5% by mass of the mass of TREO, the formation of a necessary amount of oxychlorides of rare earth elements (particularly lanthanum) is ensured and an abrasive superior in dispersion maintaining properties can be manufactured. The reason for this is that lanthanum (element) is highly capable of reacting chlorine-containing substances other than the chlorine-containing substances of rare earth elements or gases such as chlorine gas formed through the decomposition of the chlorine-containing substances by the roasting and of forming its oxychlorides.

Then the other (latter) roasting method, that is, a method in which a raw material is roasted in an atmospheric gas including a chlorine-containing gas (chlorine-containing substance) will be described.

The investigation of the inventor revealed that a method was also suitable in which chlorine treatment was also carried out during the roasting step. In this case, the roasting step involves roasting and chlorine treatment at the same time. Since roasting is carried out in the high temperature situation, such situation is suitable as the condition under which oxychlorides of rare earths are formed. And it is considered that if chlorine treatment is carried out while a chlorine-containing substance is fed in such a situation, the chlorine-containing substance fed is effectively used and oxychlorides of rare earths are formed at high efficiency. Means for allowing the atmospheric gas to contain a chlorine-containing gas include, for example, circulating a chlorine-containing gas such as chlorine gas through the roasting furnace at the time of roasting. As a raw material used, a material having a lanthanum oxide percentage in TREO of 0.5% by mass or more (preferably 5% by mass or more) is preferable. The use of such a raw material ensures the formation of a necessary amount of oxychlorides of rare earth elements (particularly lanthanum), and hence the manufacturing of an abrasive excellent in dispersion maintaining properties. This is because lanthanum (element) is highly capable of forming an oxychloride when reacting with a chloride component, as described above in relation to the former roasting method.

The inventor investigated the chlorine-containing gases which are suitable to be contained in the atmospheric gas. As a result, it was found that not only chlorine gas and hydrogen chloride gas, but also organic chlorine substances with boiling points of 200° C. or less (preferably 100° C. or less) could be used as long as they were in the gas state. And further investigation revealed that as the chlorine-containing gases to be contained in the atmospheric gas, chlorine gas and hydrogen chloride gas were preferable which made easier flue gas treatment.

The inventor also investigated the concentration of the chlorine-containing gas in the atmospheric gas at the time of roasting. As a result, it was found that the chlorine atom content in the abrasive manufactured could be increased or decreased by increasing or decreasing the amount of chlorine atom contained in the atmospheric gas at the time of roasting. Further investigation indicated that there was a suitable concentration range of a chlorine-containing gas for manufacturing abrasive.

Specifically, the concentration of the chlorine-containing gas in the atmospheric gas is preferably $0.01/n$ % by volume to $20/n$ % by volume, where "n" is the number of chlorine atoms constituting one molecule of the chlorine-containing gas.

If the concentration of the chlorine-containing gas is increased to more than the maximum value, a problem arises that the roasting furnace is significantly impaired due to the effect of the chlorine component, though a chlorine compound is reliably formed in the abrasive.

On the other hand, if the concentration of the chlorine-containing gas is decreased to less than the minimum value, a problem of impairing the apparatus does not occur. However, since a necessary amount of chlorine (element) becomes hard to ensure as the chlorine concentration is decreased, there arises a need to feed chlorine into the roasting atmosphere by, for example, circulating a prescribed concentration of chlorine-containing gas. However, with the concentration of the chlorine-containing gas less than the minimum value of the above described range, the amount of gas circulated becomes large in itself. And too large an amount of gas circulation causes another problem of increase in the amount of heat exchange involved by the circulation, leading to extreme lowering of heat efficiency at the time of roasting. Lowering of heat efficiency offers the disadvantage of, for example, increasing energy consumption. And it may also cause a problem of unstable roasting temperature.

After close examination of these problems, the inventor found that the concentration of the chlorine-containing gas in the atmospheric gas was preferably in the above described range. As aforementioned, the concentration range of the chlorine-containing gas depends on the value "n", the number of chlorine atoms. As is known, molecular formula of chlorine gas is $Cl_2$, that is, "n"=2. Accordingly, when using chlorine gas, the concentration of the chlorine gas in the atmospheric gas is preferably 0.005% by volume to 10.0% by volume. When using hydrogen chloride gas (molecular formula HCl, "n"=1), the concentration of the hydrogen chloride gas in the atmospheric gas is preferably 0.01% by volume to 20.0% by volume. Taking into account easiness of roasting temperature control and reliable prevention of apparatus's impairment, the concentration of the chlorine-containing gas in the atmospheric gas is preferably 0.1/n % by volume to 10/n % by volume.

When using a mixed gas G in which more than one kind of chlorine-containing gas G1, G2, . . . are mixed, first values $n_1$ (=n×$m_1$), $n_2$ (=n×$m_2$), are calculated which are the products obtained by multiplying "n", the value applied when using each chlorine-containing gas independently for each chlorine-containing gas G1, G2, . . . to be mixed, by $m_1$, $m_2$, . . . , the rate of each chlorine-containing gas to the mixed gas (molar fraction). And the sum of the calculated values ($n_1$+$n_2$+ . . . ) is used as the value "n" of the mixed chlorine-containing gas G. For example, when using a mixed gas of chlorine gas and hydrogen chloride gas obtained by mixing them at a rate that provides a chlorine gas: hydrogen chloride gas molar fraction ratio of 1:3, the result of the above calculation about chlorine gas ("n"=2) is 0.5 (=2×¼), and the result about hydrogen chloride gas ("n"=1) is 0.75 (=1×¾). And the sum of these calculated values, 1.25 (=0.5+0.75), is the value "n" used to define the suitable gas concentration range of the mixed gas.

The roasting temperature in the roasting step of the method for manufacturing an abrasive of this invention is preferably 600° C. to 1200° C. If the temperature is decreased to lower than 600° C., an abrasive having a required polishing rate cannot be obtained. If the temperature is increased to higher than 1200° C., an abrasive is obtained which is more likely to cause scratches.

BEST MODE FOR CARRYING OUT THE INVENTION

In the following, this invention will be described in terms of its preferred embodiments.

Embodiment 1

As the raw material for a cerium-based abrasive was prepared a rare earth oxide raw material obtained by purifying Chinese complex ore. The TREO percentage in the raw material was 98% by mass, the cerium oxide percentage in TREO ($CeO_2$/TREO) was 60% by mass, and the lanthanum oxide percentage in TREO ($La_2O_3$/TREO) was 34.2% by mass. Hereinafter the description of each component percentage in TREO will be omitted, since the percentage will not be changed as long as no rare earth substances are added to the raw materials in the course of the manufacturing. Twenty-five kg of this raw material and 25 kg of deionized water were blended to obtain an abrasive raw material slurry (hereinafter referred to as raw material slurry). This raw material slurry was wet-milled in a ball mill (by Mitsui Mining Co., Ltd., Saio: Model SC220/70). The capacity of the milling vessel was 100 L (liter). The milling media used in this wet milling were 140 kg of zirconia (YTZ) balls 5 mm in diameter and the milling duration was 5 hours.

Subsequently, chlorine treatment was applied in the following manner to 10 kg of raw material slurry (equivalent to 5 kg of rare earth oxide raw materials) batched off from the raw material slurry obtained by the wet milling. First, a mixing vessel equipped with a stirrer was prepared. Then the batched-off raw material slurry and 0.5 L of 4.0 mol/L aqueous solution of hydrochloric acid were fed into the mixing vessel and stirred for 30 minutes at room temperature (23° C.).

The raw material slurry after the chlorine treatment was filtered by filter press method to obtain a cake-like raw material. The cake-like raw material was placed in a PTFE vat and left to stand to be dried. The drying temperature and duration were 130° C. and 24 hours, respectively. After the drying, the obtained raw material was dry-crushed in a roll crusher and then dry-milled in a sample mill. The raw material after the milling was then roasted. The roasting temperature and duration were 900° C. and 6 hours, respectively. The time spent in heating up the raw material to the roasting temperature was 6 hours. After the roasting, the obtained raw material was first milled in a sample mill and then classified with a classifier (Turbo Classifier, manufactured by Nissin Engineering Co., Ltd.) to obtain a cerium-based abrasive. The point of classification was 5 μm. The obtained abrasive had a content of 99.0% by mass TREO and less than 0.1% by mass fluorine.

Embodiments 2 and 3

COMPARATIVE EXAMPLE 1

These embodiments and comparative example are different from Embodiment 1 in the amount of hydrochloric acid fed for the chlorine treatment. The amount of hydrochloric acid fed into the mixing vessel was 1.0 L in Embodiment 2, 1.5 L in the third embodiment, and 0 L in Comparative Example 1. In Comparative Example 1 the chlorine treatment was not applied to the raw material slurry. Since the abrasive manufacturing conditions, other than the amount of hydrochloric acid fed for the chlorine treatment, were the same as those of Embodiment 1, the description will be omitted. The TREO percentage in the abrasive obtained in Embodiment 2 was 98.6% by mass, the TREO percentage in the abrasive obtained in Embodiment 3 was 98.4% by mass, and the TREO percentage in the abrasive obtained in Comparative Example 1 was 99.1% by mass.

The percentage of the total mass of chlorine (element), on a TREO mass basis, contained in each of the cerium-based abrasives obtained as above (hereinafter sometimes referred to as Cl content) and the percentage of the total mass of chlorine (element), on a TREO mass basis, contained in each of the raw materials provided for roasting in the manufacturing of the abrasives were determined. The method of determining the Cl contents was as follows.

Determination of Cl Content

An abrasive in the dried state (or a raw material before roasting) having been weighed and deionized water were blended, and heated to about 85° C. (a temperature at which the slurry containing abrasive or the raw material did not boil) for an hour. Then, the solution was filtered, and the mass of chlorine ion in the obtained filtrate was measured by Volhard titration method. The mass of TREO was measured separately, and the Cl content in the abrasive (or in the raw material to be roasted) was calculated on a TREO mass basis. The results are shown in Table 1.

TABLE 1

| Embodiment/ Comparative Example | Chlorine Treatment Condition Amount of Hydrochloric Acid Added (L) | Raw Material before Cl/TREO (%) | Component of Abrasive | | | La Content | |
|---|---|---|---|---|---|---|---|
| | | | TREO Content (% by mass) | Cl Content | | La₂O₃/ TREO (% by mass) | La/TREO (mol/kg) |
| | | | | Cl/TREO (%) | Cl/ TREO (mol/kg) | | |
| Embodiment 1 | 0.5 | 0.69 | 99.0 | 0.24 | 0.068 | 34.2 | 2.10 |
| Embodiment 2 | 1.0 | 1.22 | 98.6 | 0.53 | 0.149 | 34.2 | 2.10 |
| Embodiment 3 | 1.5 | 2.13 | 98.4 | 0.87 | 0.245 | 34.2 | 2.10 |
| Comparative Example 1 | 0 | <0.03 | 99.1 | <0.03 | <0.0085 | 34.2 | 2.10 |

Further, the Blaine diameter and specific surface area of the obtained cerium-based abrasive were determined and the dispersion maintaining properties and polishing properties (scratch evaluation) of the abrasive in the slurry state were evaluated. The determination and evaluation methods were as follows. The results are shown in Table 2.

Determination of Blaine Diameter

The specific surface area of the cerium-based abrasive was determined in accordance with the method (Blaine method) stated in "7.1 Test on Specific Surface Area" of JIS R 5201-1997 "Methods for Cement Physical Tests", and the Blaine diameter was determined based on the determined value. For example, where the specific surface area is S (m²/g) and the density of the cerium-based abrasive is $\rho$(g/cm³), the Blaine diameter d ($\mu$m) is 6/(S×$\rho$), though the detailed description of the measuring method is omitted.

Determination of Specific Surface Area (BET Value)

The specific surface area was determined in accordance with the method stated in "6.2 Flow Method" of JIS R 1626-1996 "Methods for Determining Specific Surface Area of Fine Ceramics Powder by Gas Absorption BET Method" (in particular "single-point determination").

Determination of Dispersion Maintaining Properties

In order to determine the dispersion maintaining properties of an abrasive slurry, what is known as sedimentation test was carried out. First, an abrasive slurry having an abrasive (solid content) concentration of 20% by mass was prepared by blending each abrasive powder and deionized water. A prescribed amount of the abrasive slurry was put into a test tube as it was stirred and dispersed. Then, the test tube was left to stand for 8 hours, and the state in which the abrasive sedimented in the abrasive slurry was observed and evaluated (according to three ranks). In each table, "E" indicates that the entire slurry consisted of a uniform suspended layer and no boundary lines could be observed, "G" indicates that a sedimentation cake layer which could be differentiated from a suspended layer was ascertained at the bottom of the test tube, but a clear liquid layer could not be ascertained, and "P" indicates that not only a sedimentation cake layer which could be differentiated from a suspended layer was ascertained at the bottom of the test tube, but also a clear liquid layer was ascertained at the upper portion of the test tube.

Scratch Evaluation

Polishing tests were carried out under the conditions described later using the cerium-based abrasives obtained in respective embodiments and comparative example, and the evaluation was made based on the presence or absence of scratches on the surfaces (the polished surfaces) of the glasses obtained by polishing with the above abrasives. Specifically, the surfaces of the glasses after polishing were irradiated with a halogen lamp of 300,000 luces so that they were observed by reflection method, the number of large scratches and small scratches observed was expressed in points, and the polishing properties were marked by deducting points from 100. To use an abrasive in finish polishing of glass substrates for hard discs or LCDs, the abrasive is required to score 90 points or higher, and preferably 95 points or higher; thus, in this scratch evaluation, the score of 90 points or higher is indicated with "G" and that of less than 90 points by "P". This time, the scores of respective embodiments, including Embodiment 4 to Embodiment 10 which will be described later, are all 95 points or higher.

For the polishing tests, Oscar type polishing tester (by Taito Seiki Co., Ltd., Model HSP-21) was used. The abrasive slurries used were those prepared by blending deionized water, as a dispersion medium, with the abrasive to be tested and simply stirring the solution, and they had a solid content concentration of 10% by mass. Five L of each of these abrasive slurries was prepared and fed to a polyurethane polishing pad at a rate of 500 mL/min as it was circulated, and the surface (the surface to be polished) of glass sheet for a flat panel 60 $\phi$mm was polished with the polishing pad for 5 minutes. The pressure of the polishing pad against the surface to be polished was 49 kPa (0.5 kg/cm²) at the time of polishing and the rotational speed of the polishing tester was 1,000 rpm. The surface of the glass sheet obtained by the polishing was washed with deionized water and dried in the dust-free state to obtain a glass sheet surface to be evaluated.

TABLE 2

| Embodiment/Comparative Example | Component of Abrasive | | | Physical Properties of Abrasive | | Properties of Abrasive | |
|---|---|---|---|---|---|---|---|
| | TREO Content (% by mass) | Cl/TREO (%) | Molar Ratio (Cl/La) | Blaine Diameter (μm) | Specific Surface Area (m$^2$/g) | Dispersion Maintaining Properties | Scratch Evaluation |
| Embodiment 1 | 99.0 | 0.24 | 0.032 | 0.50 | 7.95 | E | G |
| Embodiment 2 | 98.6 | 0.53 | 0.071 | 0.49 | 8.02 | E | G |
| Embodiment 3 | 98.4 | 0.87 | 0.117 | 0.49 | 8.10 | E | G |
| Comparative Example 1 | 99.1 | <0.03 | <0.004 | 0.51 | 7.92 | P | P |

As shown in Table 2, when comparing all of the embodiments and Comparative Example 1, there was almost no difference in TREO content, Blaine diameter and specific surface area of the abrasives. On the other hand, there was a significant difference in Cl content. And as for the abrasive properties such as dispersion maintaining properties and scratch evaluation, only those of the abrasive of Comparative Example 1, which contained almost no Cl (the total mass of Cl contained was equivalent to less than 0.05% of the mass of TREO), were poor. In any of the abrasives of the embodiments and Comparative Example 1, the molar ratio of chlorine atom to lanthanum atom (Cl/La) in the abrasive was 1 or less. However, in the abrasive of Comparative Example 1 alone, the ratio was as extremely small (less than 0.02) as less than 0.004.

When using any one of the abrasives of the embodiments, high dispersion maintaining properties of the abrasive could be ensured just by blending the abrasive with a dispersion medium such as water and simply stirring the solution to prepare an abrasive slurry. When carrying out polishing operations with an abrasive slurry using any one of the abrasives of the embodiments, scratches could be prevented from occurring on the polished surface, though this may be because the abrasives of the embodiments excelled in dispersion maintaining properties.

It is considered from the above results that the reason the abrasives of the embodiments excelled in dispersion maintaining properties and hardly caused scratches is that they had a prescribed percentage of Cl. These embodiments revealed that the abrasive should contain Cl in amounts, on a mass basis, equivalent to at least 0.1 to 1.0% of the mass of TREO.

Abrasive Life Test

After completing the polishing of a glass sheet (a first one), which was an object of scratch evaluation, a second one, a third one, . . . and a total of 100 glass sheets were subjected to the polishing test under the same polishing test conditions without replacing the abrasive slurry. After every prescribed numbers of glass sheets had been polished, a polishing value was determined on each subsequent sheet after it had been polished in order to evaluate its abrasive life. The polishing value was obtained as follows. And the objects of the life test were the abrasives of the first and the third embodiments and of Comparative Example 1. The test results are shown in Table 3.

Evaluation of Polishing Value

The glass sheets were weighed before and after subjected to polishing operations so that their weight losses due to the polishing operations were obtained, and the polishing values were determined based on the weight loss values. Each polishing value was expressed by the relative value to the weight loss value, as a reference value (100), of the first glass sheet which had been subjected to polishing operations with the abrasive of Comparative Example 1.

TABLE 3

| Embodiment/Comparative Example | Polishing Value | | | |
|---|---|---|---|---|
| | 1st Glass Sheet | 20th Glass Sheet | 50th Glass Sheet | 100th Glass Sheet |
| Embodiment 1 | 101 | 97 | 91 | 80 |
| Embodiment 3 | 100 | 99 | 95 | 88 |
| Comparative Example 1 | 100 | 88 | 72 | 37 |

As shown in Table 3, for the abrasives of both embodiments, their polishing values were 80 or more even in the 100th glass sheets, showing that high polishing performance was maintained over a long time. On the other hand, for the abrasive of Comparative Example 1, its polishing value was already decreased to near 70 in the 50th glass sheet, showing that its polishing performance deteriorated in a relatively short time. These results revealed that the abrasives of the embodiments, which had a prescribed percentage of Cl, had a longer life.

Embodiment 4

A raw material slurry was obtained by blending 25 kg of the same raw material as that of Embodiment 1 and 25 kg of deionized water. This raw material slurry was wet-milled in the same ball mill and under the same conditions as those of Embodiment 1. The raw material slurry obtained by the wet milling was filtered by filter press method to obtain a cake-like raw material. The cake-like raw material weighed 32 kg. Chlorine treatment was applied to 6.4 kg of cake-like raw material (equivalent to 5 kg of rare earth oxide raw materials) having been batched off from the cake-like raw material obtained by the filtration.

First, a solution of chlorides of rare earth elements used for the chlorine treatment was prepared by blending rare earth chlorides (TREO content of 47% by mass) and deionized water. In the prepared chloride solution, the TREO concentration was 200 g/L, $CeO_2$/TREO was 50% by mass, $La_2O_3$/TREO was 26% by mass, and the chlorine (element) concentration was 125 g/L. 0.24 L of this solution and 6.4 kg of cake-like raw material (equivalent to 5 kg of rare earth oxide raw materials) having been batched off from the cake-like raw material obtained by the filtration were put in mixing and stirring equipment (manufactured by Dalton Corporation, Universal Mixer and Stirrer Model 5DM) and mixed for 1 hour.

The mixture obtained after the mixing was placed in a PTFE vat and left to stand to be dried. The drying temperature and duration were 130° C. and 24 hours, respectively. The raw material obtained after the drying was dry-crushed under the same conditions as those of the first embodiment, and the raw material after the crushing was roasted, the raw material after the roasting was milled and classified to obtain a cerium-based abrasive. The fluorine concentration of the obtained abrasive was less than 0.1% by mass.

Embodiments 5 and 6

These embodiments were different from Embodiment 4 in the amount of chloride solution added for chlorine treatment. The amounts were 0.8 L in Embodiment 5 and 1.6 L in Embodiment 6. The abrasive manufacturing conditions, including the chlorine treatment conditions, other than the amounts of the chloride solution added were the same as those of Embodiment 4.

The Cl content, Blaine diameter and specific surface area were determined of each of the cerium-based abrasives obtained in Embodiments 4 to 6 while their polishing properties are evaluated. The results are shown in Tables 4 and 5. The methods of determination and evaluation were the same as the aforementioned methods.

ments excelled in dispersion maintaining properties and hardly caused scratches is that they had a prescribed percentage of Cl. These embodiments revealed that the abrasive should contain Cl in amounts, on a mass basis, equivalent to at least 0.3% to 3.0% of the mass of TREO.

Embodiment 7

As the raw material for a cerium-based abrasive, a concentrate of bastnaesite was prepared. The TREO percentage in the raw material was 70% by mass, the cerium oxide percentage in TREO was 50% by mass, and the lanthanum oxide percentage in TREO was 30.2% by mass. Twenty-five kg of this raw material and 25 kg of deionized water were blended to obtain a raw material slurry. This raw material slurry was wet-milled in the same ball mill and under the same conditions as those of the first embodiment. The raw material slurry after the wet milling was placed in a PTFE vat and left to stand to be dried. The drying temperature and duration were 130° C. and 24 hours, respectively. After the drying, the obtained raw material was dry-crushed under the same conditions as those of the first embodiment.

Half of the raw material after the drying was roasted under the following conditions as it was subjected to chlorine treatment. The roasting temperature and duration were 800° C. and 6 hours, respectively, and the time spent in heating up the raw material to the roasting temperature was 6 hours. The reason that the roasting temperature was decreased to

TABLE 4

| Embodiment/ Comparative Example | Chlorine Treatment Condition Amount of Solution Added (L) | Raw Material before Roasting Cl/TREO (%) | Component of Abrasive | | | | La Content | |
|---|---|---|---|---|---|---|---|---|
| | | | TREO Content (% by mass) | Cl Content | | | La$_2$O$_3$/TREO | |
| | | | | Cl/TREO (%) | Cl/TREO (mol/kg) | | (% by mass) | La/TREO (mol/kg) |
| Embodiment 4 | 0.24 | 0.58 | 98.6 | 0.45 | 0.127 | | 34.1 | 2.09 |
| Embodiment 5 | 0.8 | 1.9 | 97.7 | 1.28 | 0.361 | | 33.9 | 2.08 |
| Embodiment 6 | 1.6 | 3.8 | 96.3 | 2.71 | 0.764 | | 33.7 | 2.07 |

TABLE 5

| Embodiment/ Comparative Example | Component of Abrasive | | | Physical Properties of Abrasive | | Properties of Abrasive | |
|---|---|---|---|---|---|---|---|
| | TREO Content (% by mass | Cl/TREO (%) | Molar Ratio (Cl/La) | Blaine Diameter (μm) | Specific Surface Area (m$^2$/g) | Dispersion Maintaining Properties | Scratch Evaluation |
| Embodiment 4 | 98.6 | 0.45 | 0.061 | 0.50 | 7.99 | E | G |
| Embodiment 5 | 97.7 | 1.28 | 0.174 | 0.48 | 8.24 | E | G |
| Embodiment 6 | 96.3 | 2.71 | 0.369 | 0.46 | 8.46 | E | G |

As shown in Table 5, there were almost no differences in the TREO, Blaine diameter and specific surface area of abrasive among the abrasives of the embodiments. On the other hand, there was a significant difference in Cl content among them. Possibly this is due to the difference in the chlorine treatment conditions in the manufacturing of the abrasives. The polishing properties such as dispersion maintaining properties and scratch evaluation were good in all of the abrasives of the embodiments. It is considered from the above results that the reason the abrasives of the embodi- 800° C. is that since the concentrate of bastnaesite as the raw material contains fluorine, if the raw material is roasted at 900° C. as in the case of Embodiment 1, sintering progresses, resulting in the particle diameter of the raw material after roasting larger than that of Embodiment 1. When the roasting is carried out at 800° C., the particle diameter of the raw material after the roasting is almost the same as that of Embodiment 1, which makes easier the comparison of the performance etc. between the obtained abrasives. The atmospheric gas at the time of roasting had a content of 96.0% by volume air and 4.0% by volume chlorine gas ($Cl_2$). The gas having such a content of components was fed into and circulated through the roasting furnace at a circulation rate of 5 NL/min for 12 hours between the start of temperature elevation and the end of the roasting. The term "NL" herein used means the volume (liter) of gas in the standard state.

After the roasting, the obtained raw material was milled and classified under the same conditions as those of Embodiment 1 to obtain a cerium-based abrasive. The fluorine concentration of the obtained abrasive was 6.0% by mass.

COMPARATIVE EXAMPLE 2

This comparative example is different from Embodiment 7 in the atmospheric gas fed into the roasting furnace. In Comparative Example 2, the roasting step was carried out by feeding air (100% air) into the roasting furnace while circulating the same through the furnace. In other words, in Comparative Example 2, chlorine treatment was not carried out. The abrasive manufacturing conditions other than the gas circulated through the furnace in the roasting step were the same as those of Embodiment 7. The fluorine concentration of the obtained abrasive was 6.2% by mass.

The Cl content, Blaine diameter and specific surface area of the cerium-based abrasives obtained in Embodiment 7 and Comparative Example 2 were determined and the polishing properties of the abrasives were evaluated. The results are shown in Tables 6 and 7. The determination and evaluation procedures were the same as the aforementioned methods.

Possibly this is due to the difference in the chlorine treatment conditions in the manufacturing of the abrasives. As for the polishing properties such as dispersion maintaining properties and scratch evaluation, only those of the abrasive of Comparative Example 2, which contained almost no Cl (the mass equivalent to less than 0.05% of the mass of TREO), in more particular, which contained Cl in amount, on a mass basis, equivalent to less than 0.03% of the mass of TREO, were poor. The results showed that even when the raw material was the concentrate of bastnaesite, if the abrasive was allowed to contain Cl by chlorine treatment, its dispersion maintaining properties were improved and it hardly caused scratches on the surface of the object of the polishing. These results also revealed that the chlorine treatment method was effective in which chlorine treatment was carried out by circulating a chlorine-containing gas through the roasting furnace at the time of roasting. Further, it was found that when using chlorine gas as a chlorine-containing gas, 4.0% by volume was a suitable value as the chlorine gas percentage in the atmospheric gas.

Embodiment 8

As the raw material for a cerium-based abrasive, cerium oxide was prepared. The TREO percentage in the raw material was 99.0% by mass, the cerium oxide percentage in TREO was 99.9% by mass or more, and the lanthanum oxide percentage in TREO was 0.05% by mass or less. A cerium-based abrasive was manufactured using 25 kg of this raw material under the same conditions as those of Embodiment 1, except that the roasting temperature was different. In other words, in Embodiments 1 and 8, chlorine treatment was

TABLE 6

| Embodiment/ Comparative Example | Chlorine Treatment Condition Amount of Chlorine Gas Circulated (NL/min) | Raw Material before Roasting Cl/TREO (%) | Component of Abrasive | | | | | |
|---|---|---|---|---|---|---|---|---|
| | | | TREO Content (% by mass) | Cl Content | | La Content | | |
| | | | | Cl/TREO (%) | Cl/ TREO (mol/kg) | $La_2O_3$/ TREO (% by mass | La/TREO (mol/kg) | |
| Embodiment 7 | 5 | 0.04 | 88.2 | 0.70 | 0.197 | 30.2 | 1.85 | |
| Comparative Example 2 | 0 | 0.04 | 88.5 | <0.03 | <0.0085 | 30.2 | 1.85 | |

TABLE 7

| Embodiment/ Comparative Example | Component of Abrasive | | | Physical Properties of Abrasive | | Properties of Abrasive | |
|---|---|---|---|---|---|---|---|
| | TREO Content (% by mass | Cl/TREO (%) | Molar Ratio (Cl/La) | Blaine Diameter (µm) | Specific Surface Area ($m^2$/g) | Disper-sion Maintaining Properties | Scratch Evaluation |
| Embodiment 7 | 88.2 | 0.70 | 0.106 | 0.52 | 7.88 | E | G |
| Comparative Example 2 | 88.5 | <0.03 | <0.005 | 0.54 | 7.75 | P | P |

As seen from Table 7, there were almost no differences in the TREO, Blaine diameter and specific surface area between the abrasives of Embodiment 7 and Comparative Example 2, when comparing them. On the other hand, there was a significant difference in Cl content between the two.

applied to the raw material slurry obtained by wet milling using hydrochloric acid. The roasting temperature was 800° C. The reason that the roasting temperature was decreased to 800° C. is that since the raw material according to this embodiment as the object of the roasting had a higher percentage of cerium oxide in TREO, if the raw material is roasted at 900° C. as in the case of Embodiment 1, sintering progresses too much, which makes the raw material after the roasting greater in particle diameter and smaller in specific surface area than those of Embodiment 1 and which makes the comparison more difficult. When the roasting is carried out at 800° C., the particle diameter of the raw material after the roasting is almost the same as that of Embodiment 1, which makes easier the comparison of the performance etc. between the obtained abrasives. The obtained abrasive had a content of 99.5% by mass TREO and less than 0.1% by mass fluorine.

Embodiment 9

This embodiment is different from Embodiment 8 in the raw material used. The raw material used in this embodiment was obtained by dry-blending lanthanum oxide powder of high purity with the raw material of Embodiment 8, and the TREO percentage in the raw material was 99.0% by mass, the cerium oxide percentage in TREO was 95.0% by mass, and the lanthanum oxide percentage in TREO was 5.0% by mass. A cerium-based abrasive was manufactured using 25 kg of this raw material under the same conditions as those of Embodiment 8, except that the roasting temperature was different. The roasting temperature was 830° C. The obtained abrasive had a content of 99.1% by mass TREO and less than 0.1% by mass fluorine.

Embodiment 10

A cerium-based abrasive was manufactured using the same raw material as that of Embodiment 8 under the same conditions as those of Embodiment 4, except that the chloride solution used for chlorine treatment and the roasting temperature were different. In other words, in this embodiment, the chlorine treatment was applied to the cake-like raw material obtained by filtering the wet-milled raw material slurry by filter press. Of the manufacturing conditions different from those of Embodiment 4, the roasting temperature was 800° C. And the chloride solution used for chlorine treatment was a solution of cerium chloride in which the TREO content was 200 g/L, $La_2O_3$/TREO was 0.05% by mass or less, $CeO_2$/TREO was 99.9% by mass or more, and the chlorine (element) content was 125 g/L. The obtained abrasive had a content of 99.0% by mass TREO and less than 0.1% by mass fluorine.

COMPARATIVE EXAMPLE 3

A cerium-based abrasive was manufactured using the same raw material and under the same conditions as in Embodiment 8, except that chlorine treatment was not carried out. In other words, in this comparative example, a cerium-based abrasive was manufactured without chlorine treatment. The obtained abrasive had a content of 99.5% by mass TREO and less than 0.1% by mass fluorine.

The Cl content, Blaine diameter and specific surface area of the cerium-based abrasives obtained in Embodiments 1 and 4, Embodiments 8 to 10, and Comparative Example 3 were determined and the polishing properties of the abrasives were evaluated. The results are shown in Tables 8 and 9. The determination and evaluation procedures were as aforementioned.

TABLE 8

| Embodiment/ Comparative Example | Chlorine Treatment Condition Amount of Solution Added (L) | Raw Material before Roasting Cl/TREO (%) | Component of Abrasive | | | La Content | |
|---|---|---|---|---|---|---|---|
| | | | TREO Content (% by mass) | Cl Content | | $La_2O_3$/ TREO (% by mass) | La/TREO (mol/kg) |
| | | | | Cl/TREO (%) | Cl/ TREO (mol/kg) | | |
| Embodiment 1 | 0.5 | 0.69 | 99.0 | 0.24 | 0.068 | 34.2 | 2.10 |
| Embodiment 8 | 0.5 | 0.66 | 99.5 | 0.10 | 0.028 | <0.05 | <0.0031 |
| Embodiment 9 | 0.5 | 0.68 | 99.1 | 0.23 | 0.065 | 5.0 | 0.31 |
| Embodiment 4 | 0.24 | 0.58 | 98.6 | 0.45 | 0.127 | 34.1 | 2.09 |
| Embodiment 10 | 0.24 | 0.59 | 99.0 | 0.46 | 0.130 | <0.05 | <0.0031 |
| Comparative Example 3 | 0 | <0.03 | 99.5 | <0.03 | <0.0085 | <0.05 | <0.0031 |

TABLE 9

| Embodiment/ Comparative Example | Component of Abrasive | | | Physical Properties of Abrasive | | Properties of Abrasive | |
|---|---|---|---|---|---|---|---|
| | TREO Content (% by mass | Cl/TREO (%) | Molar Ratio (Cl/La) | Blaine Diameter (μm) | Specific Surface Area (m²/g) | Dispersion Maintaining Properties | Scratch Evaluation |
| Embodiment 1 | 99.0 | 0.24 | 0.032 | 0.50 | 7.95 | E | G |
| Embodiment 8 | 99.5 | 0.10 | >9.0 | 0.52 | 7.45 | G | G |
| Embodiment 9 | 99.1 | 0.23 | 0.21 | 0.51 | 7.66 | E | G |
| Embodiment 4 | 98.6 | 0.45 | 0.061 | 0.50 | 7.99 | E | G |
| Embodiment 10 | 99.0 | 0.46 | >41.9 | 0.51 | 7.73 | E | G |

TABLE 9-continued

| | Component of Abrasive | | | Physical Properties of Abrasive | | Properties of Abrasive | |
|---|---|---|---|---|---|---|---|
| | TREO | | | | Specific | | |
| Embodiment/ Comparative Example | Content (% by mass) | Cl/TREO (%) | Molar Ratio (Cl/La) | Blaine Diameter (μm) | Surface Area ($m^2/g$) | Dispersion Maintaining Properties | Scratch Evaluation |
| Comparative Example 3 | 99.5 | <0.03 | — | 0.49 | 8.13 | P | P |

As shown in Table 9, when comparing the embodiments and Comparative Example 3, there were almost no differences in the TREO, Blaine diameter and specific surface area among the abrasives. On the other hand, there was a difference in Cl content among them. As for the polishing properties such as dispersion maintaining properties and scratch evaluation, only those of the abrasive of Comparative Example 3, which contained almost no Cl (the mass equivalent to less than 0.05% of the mass of TREO), were poor.

The results showed that even when using cerium oxide or the blend of cerium oxide and lanthanum oxide as a raw material, or even when using a cerium chloride solution as a solution for chlorine treatment, if the obtained abrasives were allowed to contain Cl by chlorine treatment, their dispersion maintaining properties were improved and they hardly caused scratches on the surface of the object of the polishing. Possibly the reason the abrasives of the embodiments excelled in dispersion maintaining properties and hardly caused scratches is that they had a certain percentage of Cl.

As seen from the comparison of Embodiments 1 and 8 in Table 9, when the chlorine-containing substance used for the chlorine treatment was not a rare earth chloride, the presence or absence of lanthanum (element) in the raw material largely affected the difference in the percentage of Cl held (Cl content) on roasting. Thus, it was found that the raw materials having a lanthanum (element) content of 5.0% by mass or more were preferably used. When using such raw materials, even if a chlorine-containing substance other than rare earth chlorides is used, chlorine treatment can be performed. Table 9 shows that the abrasive of Embodiment 1 was superior to that of Embodiment 8 in dispersion maintaining properties, indicating that an abrasive preferably contains Cl in amounts, on a mass basis, equivalent to 0.2% or more of the mass of TREO. As seen from the comparison between Embodiments 4 and 9, when the chlorine-containing substance used for chlorine treatment prior to roasting was a rare earth chloride, there was created almost no difference in the percentage of Cl held on roasting, depending on the presence or absence of La in the raw material. This indicates that rare earth chlorides are preferable as the chlorine-containing substances used for chlorine treatment. The use of a rare earth chloride reliably enables the chlorine treatment, regardless of the lanthanum content of the raw material.

INDUSTRIAL APPLICABILITY

As described so far, according to this invention, a cerium-based powder abrasive can be provided which enables a cerium-based abrasive slurry to be prepared, simply by blending the cerium-based powder abrasive with a dispersion medium such as water to prepare an abrasive slurry wherein the dispersed state of its abrasive particles is maintained for a longer period of time, and makes easier the after-treatment of the abrasive slurry having been used for polishing, and in addition, a method for manufacturing the above powder cerium-based abrasive can also be provided.

The invention claimed is:

1. A rare-earth abrasive comprising low-water solubility chlorine-containing compounds of rare earth elements,
    wherein said rare-earth abrasive comprises a total mass of elemental chlorine equivalent to 0.05% to 5.0% of the mass of total rare earth oxides contained in said rare-earth abrasive, and
    said rare-earth abrasive comprises cerium oxide in an amount of 40.0% to 99.5% by mass of the total rare earth oxides and lanthanum oxide in an amount of 60.0% to 0.5% by mass of the total rare earth oxides.

2. The rare-earth abrasive according to claim 1, wherein the elemental chlorine and elemental lanthanum are present in the abrasive in a molar ratio (Cl/La) of 0.02 to 1.0.

3. A method for manufacturing the abrasive of claim 1 comprising roasting raw materials for the abrasive, wherein the raw materials are roasted while being maintained in contact with chlorine-containing substances.

4. The method for manufacturing a abrasive according to claim 3, wherein the raw materials for roasting include the chlorine-containing substances.

5. The method for manufacturing a abrasive according to claim 4, wherein the raw materials are obtained by wet-blending the raw materials for the abrasive with a solution comprising chlorine-containing substances.

6. The method for manufacturing a abrasive according to claim 4, wherein the total amount of elemental chlorine in the raw materials is equivalent to 0.1% to 8.0% of the mass of the total rare earth oxides in the raw materials.

7. The method for manufacturing a abrasive according to claim 3, wherein roasting involves roasting the raw materials in an atmospheric gas which includes a chlorine-containing gas.

8. The method for manufacturing a abrasive according to claim 7, wherein the concentration of the chlorine-containing gas in the atmospheric gas is 0.01/n % by volume to 20/n % by volume, where "n" is the number of chlorine atoms in one molecule of the chlorine-containing gas.

* * * * *